United States Patent
Kumon et al.

(10) Patent No.: US 6,812,883 B2
(45) Date of Patent: Nov. 2, 2004

(54) IN-VEHICLE RADAR SYSTEM

(75) Inventors: Hiroaki Kumon, Kariya (JP); Yukimasa Tamatsu, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/747,221

(22) Filed: Dec. 30, 2003

(65) Prior Publication Data

US 2004/0150549 A1 Aug. 5, 2004

(30) Foreign Application Priority Data

Jan. 31, 2003 (JP) ....................... 2003/024610

(51) Int. Cl.$^7$ ............................. G01S 13/93
(52) U.S. Cl. ............... 342/70; 342/71; 342/72; 342/73; 342/74; 342/139; 342/141; 342/146
(58) Field of Search ............... 342/70–77, 81, 342/85, 87, 90, 91, 107, 109, 113, 115, 125, 135, 139, 141, 146, 147, 192, 195, 196

(56) References Cited

U.S. PATENT DOCUMENTS

| | | | |
|---|---|---|---|
| 5,745,070 A | | 4/1998 | Yamada ........................ 342/70 |
| 6,073,078 A | * | 6/2000 | Kitahara et al. ............ 701/300 |
| 6,739,511 B2 | * | 5/2004 | Tsikos et al. .......... 235/462.01 |
| 2003/0004617 A1 | * | 1/2003 | Kimura et al. ................. 701/1 |
| 2004/0098196 A1 | * | 5/2004 | Sekiguchi ................... 701/301 |

OTHER PUBLICATIONS

"An algorithm for detecting roads and obstacles in radar images", Kaliyaperumal, K.; Lakshmanan, S.; Kluge, K.;Vehicular Technology, IEEE Transactions on , vol.:50, Issue: 1, Jan. 2001 Ps:170–182.*

"LEXLUTHER: an algorithm for detecting roads and obstacles in radar images", Lakshmanan, S.; Kaliyaperumal, K.; Kluge, K.;Intelligent Transportation System, 1997. ITSC 97. IEEE Conference on, Nov. 9–12, 1997 Ps:415–420.*

* cited by examiner

*Primary Examiner*—John B. Sotomayor
(74) *Attorney, Agent, or Firm*—Posz & Bethards, PLC

(57) ABSTRACT

A radar system mounted in a reference vehicle can detect a distance and orientation of a preceding vehicle to thereby compute a relative position of a width center of the preceding vehicle. A curving radius of the reference vehicle is then detected for computing a relative rotation angle between a direction from the reference vehicle and a longitudinal direction of the preceding vehicle. Relationship between a relative rotation angle and a lateral bias of the relative position of the width center is previously prepared in a map. The computed relative rotation angle is applied on the map, so that the corresponding lateral bias is obtained to correct the computed relative position of the width center of the preceding vehicle. Thus, the width center of the preceding vehicle moving in an adjacent lane can be accurately estimated.

9 Claims, 8 Drawing Sheets theta1 = atan( X / Y )
theta2 = atan[ Y / ( R − X ) ]

theta = theta2 − theta1

IN-VEHICLE RADAR SYSTEM

CROSS REFERENCE TO RELATED APPLICATIONS

This application is based on and incorporates herein by reference Japanese Patent Application No. 2003-24610 filed on Jan. 31, 2003.

FIELD OF THE INVENTION

The present invention relates to an in-vehicle radar system mounted in a vehicle capable of accurately estimating a width center of a preceding vehicle even when the preceding vehicle is moving in an adjacent lane.

BACKGROUND OF THE INVENTION

A scan-type radar mounted in a reference vehicle radiates transmission radio waves around the reference vehicle to detect an object based on reflected radio waves within a given region ahead of the reference vehicle. U.S. 5,745,070 discloses an in-vehicle scan-type radar system that determines whether a preceding vehicle exists in a lane in which a reference vehicle equipped with the scan-type radar is moving while the reference vehicle is moving around a curve. Here, while the reference vehicle is moving around the curve, the scan-type radar operates as follows: to estimate an existing orientation of a central position of the object based on a curving radius of the curve and a relative distance to the object; to set a vehicle moving lane area that extends with a given angle on either sides of the existing orientation; and to modify so that an inward area of the vehicle moving lane area located on an inward side of the curve with respect to the existing orientation is increased more than an outward area of the vehicle moving lane area.

Thereby, even when the central position of the object is detected as being biased to the inward area while the reference vehicle is moving around the curve, the existing orientation of the center position of the object is corrected outwardly in the vehicle moving lane area. This results in properly determining whether the object exists in the lane in which the reference vehicle is moving.

In the above radar system, the existing orientation of the center position of the object is estimated by the following reasons. Namely, when a reference vehicle is moving around a curve, a backside of a preceding vehicle does not face in front of the reference vehicle. Here, the transmission radio waves from the reference vehicle are radiated upon, of the object, the backside, the inner side that faces an inward portion of the curve, and a corner between the backside and the inner side. The transmission radio waves radiated upon the backside and the inner side are reflected towards a direction different from a direction where the reference vehicle is located, while the transmission radio waves radiated upon the corner are largely reflected to the direction where the reference vehicle is located. When receiving the radio waves reflected from the corner, the radar system detects the reflected radio waves as a reflection object having a width whose width center is biased to the corner that is located in an inward side of the curve from the actual center.

Thus, while the reference vehicle is moving around a curve, a data center of the detected width of the reflection object does not correspond to the actual width center of the object. The central position of the object is therefore estimated based on the curving radius of the curve and the distance to the object.

However, a case where the data center of the reflection object does not correspond to the actual width center of the object is not limited to a case where the reference vehicle is moving around the curve. For instance, suppose that in a straight road shown in FIG. 11, a preceding vehicle 30 is moving in a lane adjacent to a lane in which a reference vehicle 20 is moving. Here, the transmission radio waves from the reference vehicle 20 are radiated upon not only the backside of the preceding vehicle 30, but also the side and corner of the preceding vehicle 30. A data center of the preceding vehicle 30 is biased from the actual width center of the preceding vehicle 30.

The conventional estimating method is used for a case where a preceding vehicle 30 is moving in the same lane in which the reference vehicle 20 is moving. It is therefore not used for the above case where a preceding vehicle 30 is moving in a lane adjacent to a lane in which the reference vehicle 20 is moving.

SUMMARY OF THE INVENTION

An object of the present invention is to provide an invehicle radar system mounted in a reference vehicle capable of properly estimating a width center of a preceding vehicle even when the preceding vehicle is moving in a lane adjacent to a lane in which the reference vehicle is moving.

To achieve the above and other objects, an in-vehicle radar system mounted in a reference vehicle is provided with the following. Transmission radio waves are radiated and reflection radio waves are detected from a reflection object that receives a portion of the transmission radio wave s. A distance to the reflection object and an orientation of the reflection object with respect to the reference vehicle are recognized based on the detected reflection radio waves from the reflection object. A relative position of a width center of the reflection object with respect to the reference vehicle is computed based on the recognized distance and the recognized orientation. A curving radius of the road is detected. A relative rotation angle of the reflection object that is an angle between a direction of the transmission radio waves advancing to the width center of the reflection object and a direction perpendicular to the width direction of the reflection object is computed based on the computed relative position and the detected curving radius. The computed relative position of the width center of the reflection object is corrected by using the computed relative rotation angle.

For instance, in a straight road, when transmission radio waves are radiated to a preceding vehicle moving in an adjacent lane, the transmission radio waves are radiated on, of the preceding vehicle, a backside, a side, and a corner between the backside and the corner. Here, the reflection radio waves are mainly from the corner of the preceding vehicle to the reference vehicle. The radar system recognizes that an orientation of the reflection object is a direction of the maximum reflection strength of the reflection radio waves. A width center of the preceding vehicle is thereby estimated as being located around the corner of the preceding vehicle. The estimated width center does not correspond to an actual width center of the preceding vehicle, so that a lateral bias is generated.

To correct the lateral bias, for instance, a lateral bias correction amount is previously obtained according to a relative rotation angle. The lateral bias correction amount according to the computed relative rotation angle is used for correcting the lateral bias of the computed relative position of the width center. As a result, in the structure of the radar system of the present invention, a width center of a preceding vehicle moving in an adjacent lane can be accurately estimated.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An in-vehicle radar system according to an embodiment of the present invention constitutes a following distance control system. The following distance control system controls, in a constant speed cruise control, a vehicle speed as maintaining a distance between a reference vehicle equipped with the following distance control system and a preceding vehicle.

Figure 1:
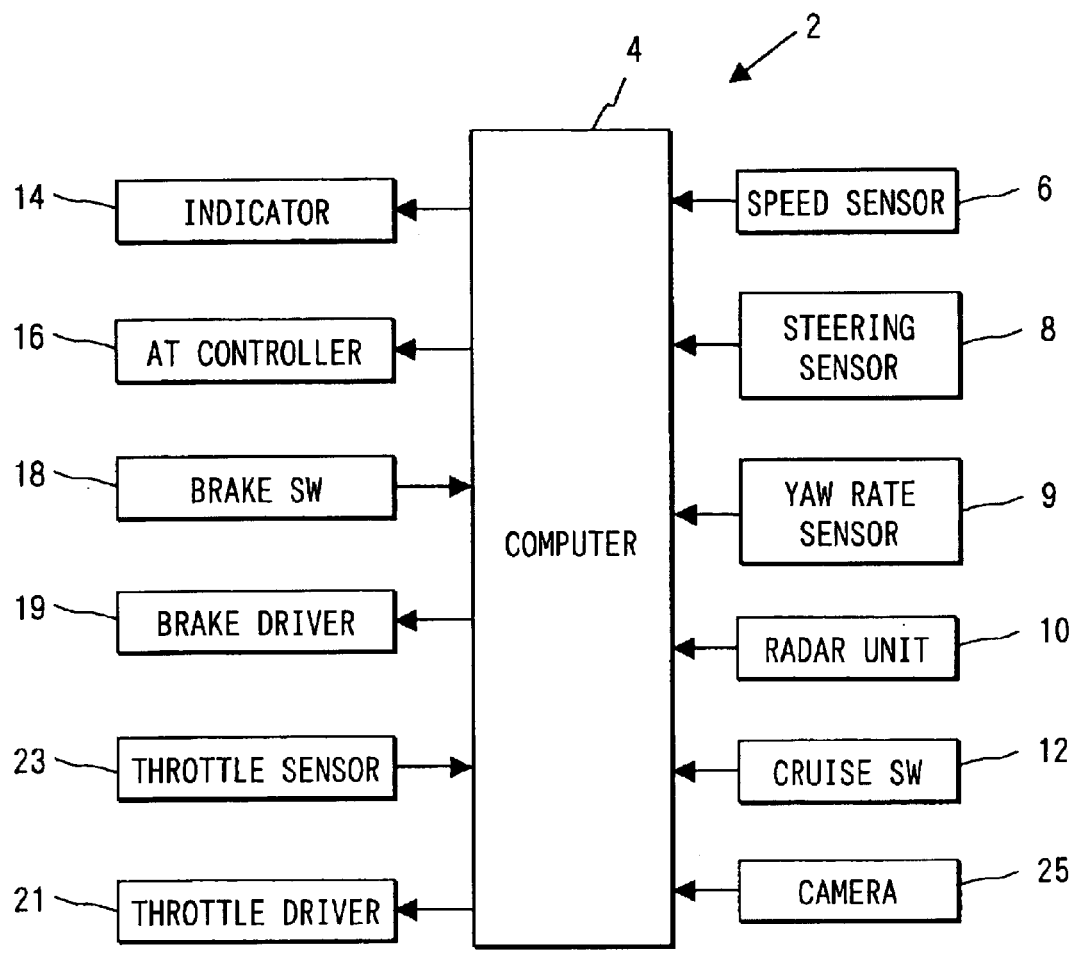
FIG. 1 is a block diagram showing an overall structure of a following distance controller according to an embodiment of the present invention.

FIG. 1 shows an overall structure of a following distance control system 2. The following distance control system 2 includes: a computer 4 as a main part; a speed sensor 6; a steering sensor 8; a yaw rate sensor 9; a radar unit 10; a cruise control switch 12; an indicator 14; an automatic transmission controller 16; a brake switch 18; a brake driver 19; a throttle driver 21; a throttle opening degree sensor 23; and the like.

The computer 4 is equipped with an input/output (I/O) interface and various driving circuits. These hardware components are common, so that explanation of them is eliminated. The computer 4 executes following a distance control for controlling a following distance with a preceding vehicle and a constant speed cruise control for maintaining a speed at a set speed when a preceding vehicle is not selected.

The speed sensor 6 detects a signal corresponding to a rotation speed of a steering wheel to output it to the computer 4. The steering sensor 8 detects a change amount of a steering angle to detect a relative steering angle from the change amount. The detected relative steering angle is outputted to the computer 4. The yaw rate sensor 9 detects an angular speed around a vertical line of the vehicle to output it to the computer 4. Output signals from the speed sensor 6, the steering sensor 8, and the yaw rate senor 9 are used for the computer to compute a curving radius of the vehicle.

The cruise control switch 12 includes five switches (not shown) such as a main switch, a set switch, a resume switch, a cancel switch, and a tap switch. The main switch enables the constant speed cruise control to be started. Within the constant speed cruise control, the following distance control is executed. The set switch is used for storing a target speed that is a speed at the moment when the set switch is pushed. After setting of the target speed, the constant speed cruise control is executed.

The resume switch is used for resuming the target speed from a current speed when the constant speed cruise control is not set, when the target speed is stored, and when the resume switch is pushed. The cancel switch is used for stopping processing when the cancel switch is pushed. The tap switch is used for setting a target following distance to a preceding vehicle. The target following distance can be set within a given region according to user's preference.

The indicator 14 includes three indicators (not shown) such as a set speed indicator, a following distance indicator, and a sensor anomaly indicator. The set speed indicator indicates a set speed in the constant speed cruise control. The following distance indicator indicates a following distance to a preceding vehicle based on a measurement result of the radar unit 10. The sensor anomaly indicator indicates anomaly occurrence when anomaly occurs in various sensors such as the speed sensor 6.

The automatic transmission controller 16 selects, of the automatic transmission, a gear position necessary for controlling a vehicle speed. The brake switch 18 detects brake pedal stepping of a driver. The brake driver 19 controls brake pressure according to instruction of the computer 4.

The throttle driver 21 controls an opening degree of a throttle valve according to instruction of the computer 4 to control output of an internal combustion engine. The throttle opening degree sensor 23 detects an opening degree of the throttle valve.

The computer 4 has a power switch (not shown). Through turning on the power switch the computer is powered to start processing. The computer 4 executes the following distance control or the constant speed cruise control by being constructed as above.

The radar unit 10 is, for instance, an FMCW (Frequency Modulation Continuous Wave) radar. The radar unit 10 is disposed around a front grille of the vehicle for radiating radio waves such as millimetric-waves ahead of the vehicle to detect the reflected radio waves from a reflection object. Based on the reflected radio waves, the radar unit 10 detects a distance to the reflection object, a relative speed of the reflection object, and an orientation of the reflection object with respect to the vehicle that is equipped with the radar unit 10 (hereinafter "reference vehicle").

Figure 2:
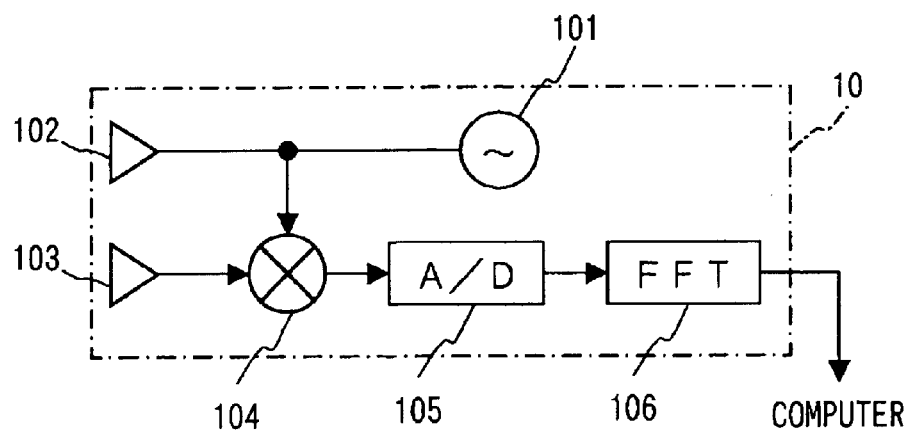
FIG. 2 is a block diagram showing a structure of a radar unit of the following distance controller.

An internal structure of the radar unit 10 will be explained with reference to FIG. 2. The radar unit 10 includes: an oscillator 101; a transmission antenna 102; a reception antenna 103; a mixer 104; an A/D converter 105; and an FFT 106.

The oscillator 101 is, for instance, a voltage control oscillator that can change an oscillation frequency by controlling magnitude of voltage. The oscillator 101 modulates an oscillation frequency having a center frequency of a given frequency.

The transmission antenna 102 is for radiating transmission radio waves ahead of the reference vehicle. The reception antenna 103 is for receiving the reflection radio waves to the transmission radio waves radiated from the transmission antenna 103. The mixer 104 mixes a transmission signal generated by the oscillator 101 and a reception signal received by the reception antenna 103 to form a single signal.

The A/D converter 105 converts, into a digital signal, an analog signal (hereinafter "beat signal") mixed by the mixer 104. The FFT 106 converts the beat signal having a time region into power spectrum data having a frequency region. Based on the power spectrum data, the distance to the reflection object, the relative speed of the reflection object, and the orientation of the reflection object are derived for outputting to the computer 4.

Figure 3A:
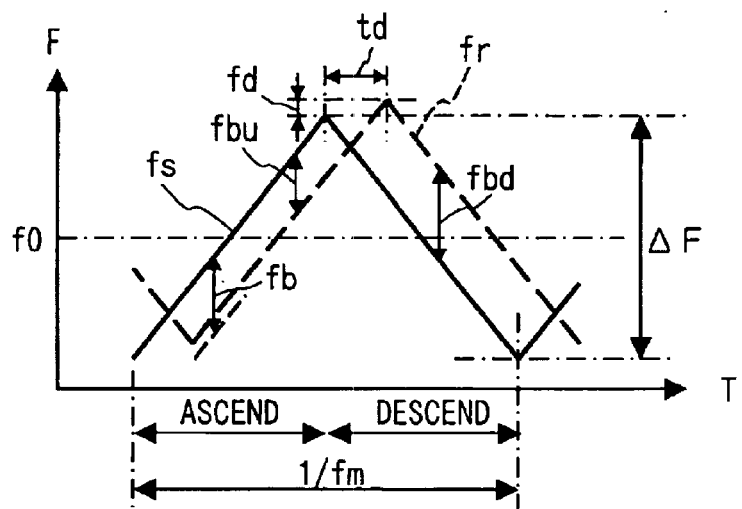
FIG. 3A is a diagram showing an instance of signals of transmission radio waves and reception radio waves.

A measurement principle of the radar unit 10 will be explained. In FIG. 3A, when a transmission radio wave fs is radiated, a reception radio wave fr is received as a reflection radio wave to the transmission radio wave fs. The transmission radio wave fs is repeatedly radiated every 1/fm from the transmission antenna 102 with having a center frequency of a frequency f0 within a modulation width of ΔF.

By contrast, the reception radio wave fr has time delay td and a frequency shift with respect to the transmission radio wave fs. In the radar unit 10 of the embodiment, the time delay td and the frequency shift are used for deriving the distance to the reflection object and the relative speed of the reflection object.

Namely, when the relative speed of the reflection object is zero, the time delay td depends on the distance to the reflection object. By contrast, the frequency shift is generated from Doppler effect. When the reference vehicle and the reflection object relatively move, a transmission radio wave fs radiated from the reference vehicle on the reflection object has an increasing frequency shift depending on the increasing relative speed. Accordingly, the frequency shift fd can be used for deriving a relative speed.

Figure 3B:
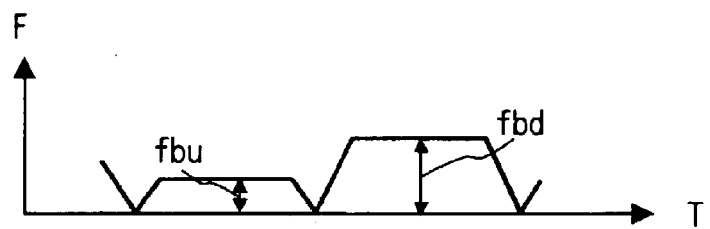
FIG. 3B is a diagram showing an instance of mixed signals of transmission radio waves and reception radio waves with a mixer.

FIG. 3B shows a beat signal generated by mixing the transmission radio wave fs and the reception radio wave fr through the mixer 104. The beat frequency fbu is a frequency shift during the frequency ascending of the transmission radio wave fs and the reception radio wave fr, while the beat frequency fbd is a frequency shift during the frequency descending.

The beat frequencies fbu, fbd can be used for obtaining a frequency fb corresponding to the distance and a frequency fd corresponding to the relative speed by using formulae as follows:

Frequency fb corresponding to distance=[ABS(*fbu*)+ABS(*fbd*)]/2      [Formula 1]

Frequency fd corresponding to relative speed =[ABS(*fbu*)−ABS(*fbd*)]/2      [Formula 2]

Furthermore, the above frequencies fb, fd can introduce a distance to a reflection object and a relative speed by using formulae as follows:

Distance=[*C*/(4×Δ*F*×*fm*)]×*fb*      [Formula 3]

Relative speed=[*C*/(2×*f0*)]×*fd*      [Formula 4]

Here, C is a light speed.

In the next place, in the radar unit 10, a measurement principle of an orientation of a reflection object with respect to a reference vehicle will be explained below.

Figure 4:
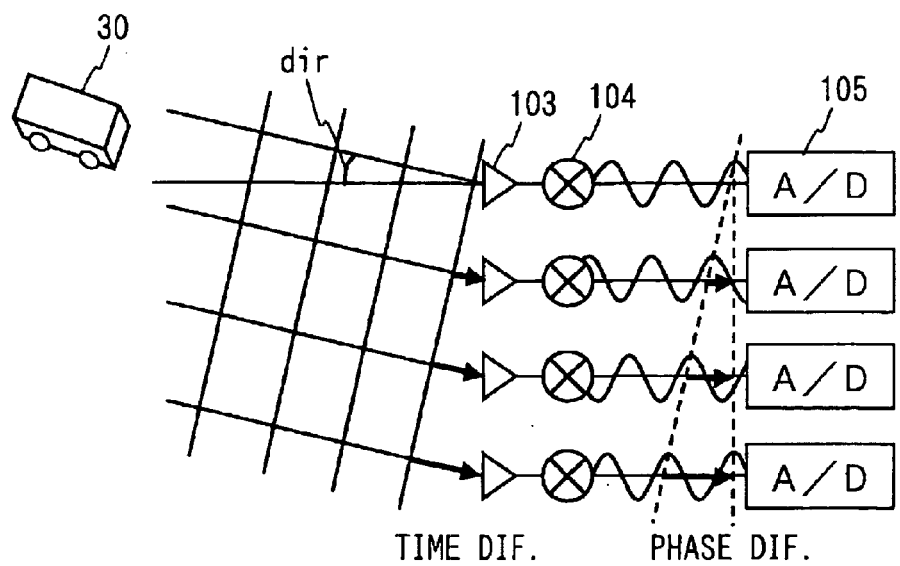
FIG. 4 is a diagram explaining a radar's measurement principle of an orientation of an object with respect to a reference vehicle.

As shown in FIG. 4, a plurality of reception antennas 103 is used for receiving reflection radio waves pertinent to the transmission radio waves from the transmission antenna 102. The reception radio waves are used for obtaining the orientation of the reflection object.

Figure 5A:
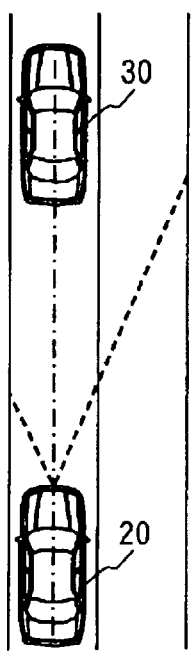
FIGS. 5A, 5B, 5C are views showing positional relationships between a reference vehicle and a preceding vehicle.

The plurality of reception antennas 103 are aligned in a width direction of the reference vehicle as shown in FIG. 4. Here, when a preceding vehicle 30 is moving in the same lane in which a reference vehicle is moving as shown in FIG. 5A, time differences among arriving times of the reception radio waves in the plurality of reception antennas 103 are hardly found. As a result, phase differences in beat signals inputted to the A/D converter 105 are hardly found since the reception radio waves are received at the same moment.

Figure 5B:
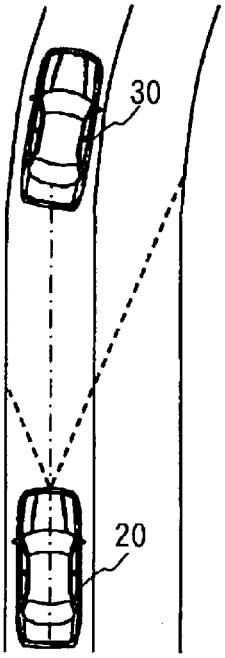

However, when a preceding vehicle and a reference vehicle are moving along a road having a curve as shown in FIG. 5B, time differences are found among the arriving times of the reception radio waves received by the plurality of reception antennas 103. Namely, the transmission radio waves from the reference vehicle are radiated on, of the preceding vehicle 30, a backside, an inner side that faces an inner side of the curve, and a corner between the backside and the inner side. Here, the transmission radio waves radiated on the backside and inner side of the preceding vehicle 30 are reflected to a direction different from a direction advancing to the reference vehicle 20. By contrast, the transmission radio waves radiated on the corner of the preceding vehicle 30 are mainly reflected to the direction advancing to the reference vehicle 20. Suppose that the above reflection radio waves advancing to the reference vehicle 20 are received by the reception antennas 103. Here, time differences of the arriving times of the reception radio waves among the respective reception antennas 103 are found according to the respective distances to reflecting portions of the preceding vehicle from the respective reception antennas 103. These time differences are obtained as phase differences in the beat signal inputted to the A/D converter 105. Accordingly, the orientation of the preceding vehicle 30 with respect to the reference vehicle 20 is obtained based on magnitude of the phase differences.

Figure 5C:
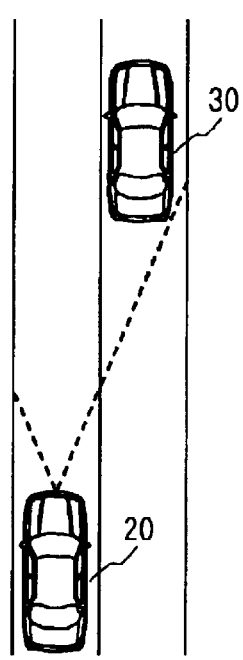

On the other hand, as shown in FIG. 5C, when the preceding vehicle 30 is moving in a lane adjacent to a lane in which the reference vehicle 20 is moving, time differences are also found among the arriving times of the reception radio waves received by the plurality of reception antennas 103. The time differences are obtained as phase differences in the beat signal.

The orientation obtained in FIG. 5B, 5C is mainly derived from the reception radio waves reflected from the corner between the backside and the side, so that the orientation does not correspond to a direction advancing to a width center of the preceding vehicle 30. Therefore, a width center computed by the computer 4 does not correspond to an actual width center of the preceding vehicle 30.

In this embodiment, it is an object to accurately matching the computed width center of the preceding vehicle 30 to the actual width center of the preceding vehicle 30. To achieve the object, a lateral bias between the width center and the actual width center is beforehand obtained under conditions where the transmission radio waves from the reference vehicle 20 radiates on the backside, the side, and the corner between the backside and the corner. Here, the lateral bias is correlated to a relative rotation angle of the preceding vehicle with respect to the reference vehicle. In detail, the relative rotation angle of the preceding vehicle is an angle between a first direction and a second direction. The first direction is from the reference vehicle to the preceding vehicle, while the second direction is a longitudinal direction of the preceding vehicle.

Figure 6A:
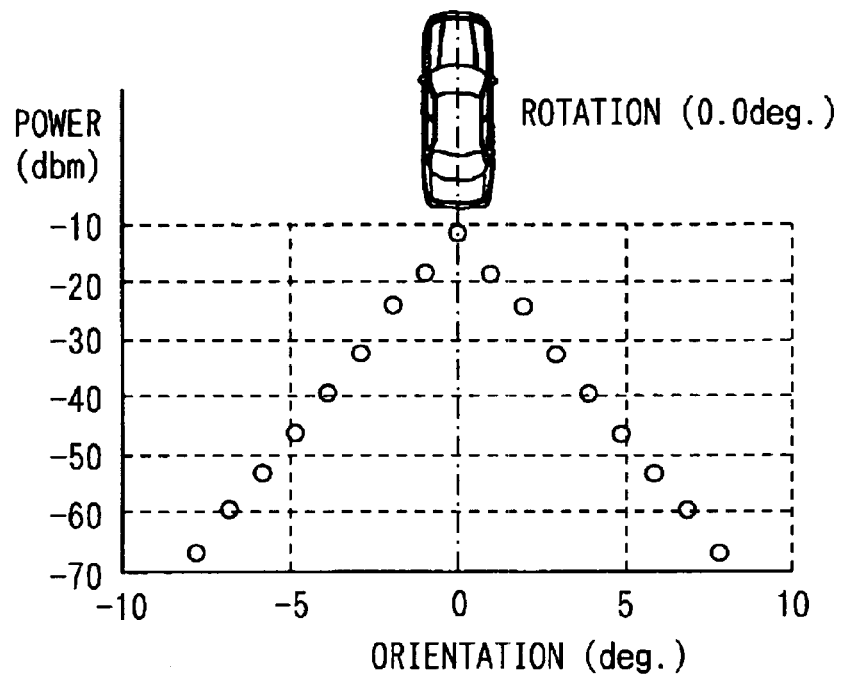
FIG. 6A is a graph showing power spectra of reception radio waves reflected from a preceding vehicle that is located with no relative rotation angle.
Figure 6B:
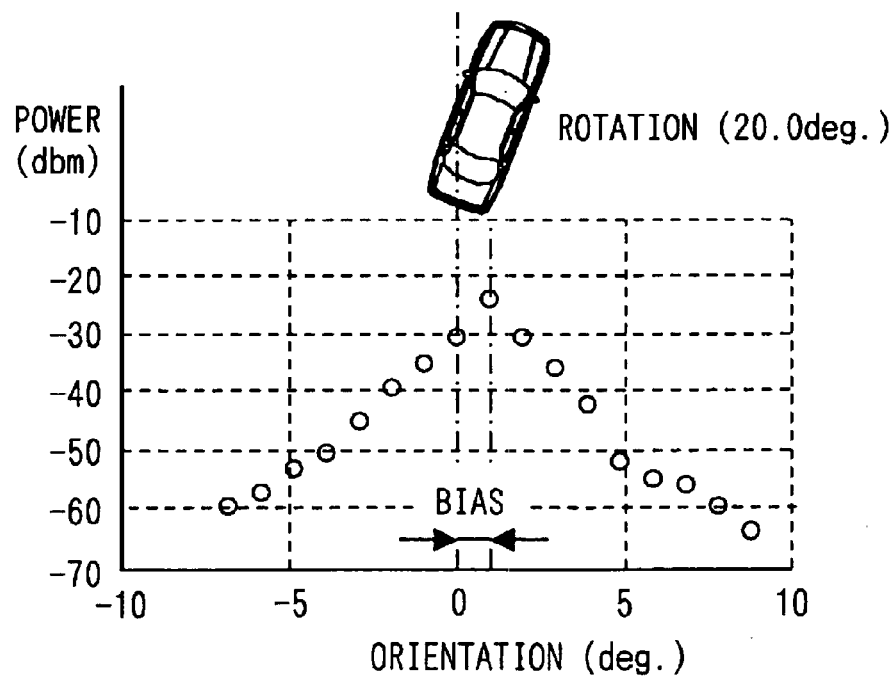
FIG. 6B is a graph showing power spectra of reception radio waves reflected from a preceding vehicle that is located with a relative rotation angle of 20 degrees.

For instance, in FIG. 6A, a preceding vehicle is disposed in front of a reference vehicle. By contrast, in FIG. 6B, a preceding vehicle is disposed with having a relative rotation angle of twenty degrees in front of a reference vehicle. In this positional relationship, the power spectrum data of the reception radio waves reflected by the preceding vehicle are beforehand obtained by experiments or the like. Here, the orientation detected by the radar unit 10 is an orientation at which the power spectrum shows the maximum value. Thus, orientation biases between a direction advancing to an actual center width and a direction advancing to the orientation at which the power spectrum shows the maximum are beforehand obtained according to relative rotation angles of the preceding vehicle.

Figure 7:
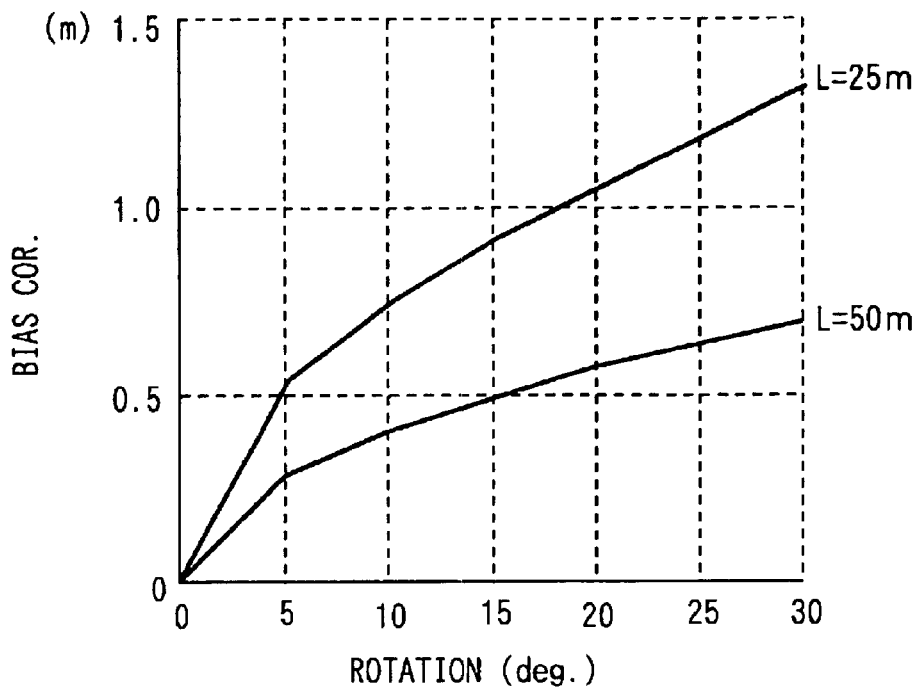
FIG. 7 is a graph showing relationship between a lateral bias correction amount and a relative rotation angle.

FIG. 7 is a map computed by the computer 4 for showing relationship between a relative rotation angle of a preceding vehicle and a correction amount of a lateral bias between a width center and an actual width center of the preceding vehicle. As shown in FIG. 7, the relationship is indicated according to a distance L, so that a lateral bias correction amount can be obtained by applying a distance L to a reflection object and a relative rotation angle of the reflection object.

Figure 8:
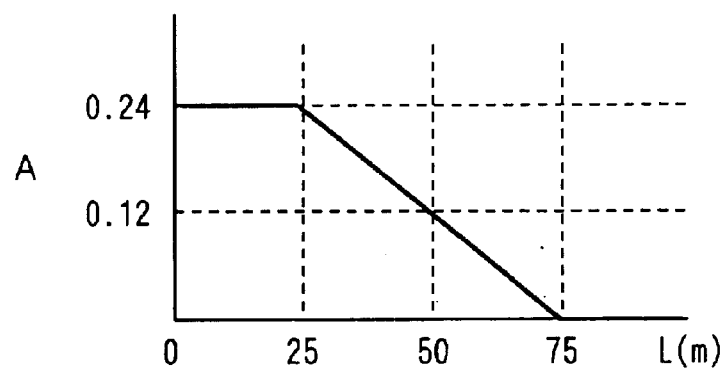
FIG. 8 is a graph showing a relationship between a coefficient A and a distance L.

Furthermore, the relationship on the map shown in FIG. 7 can be also indicated using an approximate formula as follows:

Lateral bias correction amount (m)=Coefficient $A \times$(Relative rotation angle)$^{1/2}$ Coefficient A is shown in FIG. 8. using coefficient A relating to a distance L amends differences of distance L in FIG. 7. Thus, the actual width center of the preceding vehicle 30 is accurately estimated with using the lateral bias correction amount.

As explained above, the radar unit 10 outputs the distance, the relative speed, and the orientation. The computer 4 then computes, using the distance and the orientation, width center coordinates (X, Y) of a preceding vehicle with respect to a reference vehicle. Here, an origin of coordinates (0,0) is located at a center of the radar unit 10 mounted in the reference vehicle. An axis X is a width (lateral) direction of the reference vehicle, while an axis Y is a longitudinal direction of the reference vehicle. When the computed width center coordinates shows an abnormal region, the indicator 14 indicates the effect in the sensor anomaly indicator.

A steering angle is obtained based on signals from the steering sensor 8, while a yaw rate is computed based on signals from the yaw rate sensor 9. In addition, a speed of the reference vehicle is computed based on signals from the speed sensor 6. A curving radius R (curvature radius) is computed based on the steering angle, the yaw rate, and the speed.

Furthermore, the curving radius R can be also estimated in other methods. For instance, a moving lane ahead of a reference vehicle is imaged with a CCD (charge coupled device). The moving lane is then recognized from the imaged scene to estimate a curving radius. Furthermore, when a navigation system having a GPS using satellites' waves is mounted in a reference vehicle, a present position of the reference vehicle is confirmed. The curving radius R at the present position is then obtained from map information of the navigation system.

Using the curving radius R and the width center coordinates (X, Y), the relative rotation angle of the preceding vehicle with respect to the reference vehicle is computed. The computed relative rotation angle is then used for obtaining a lateral bias.

Figure 10A:
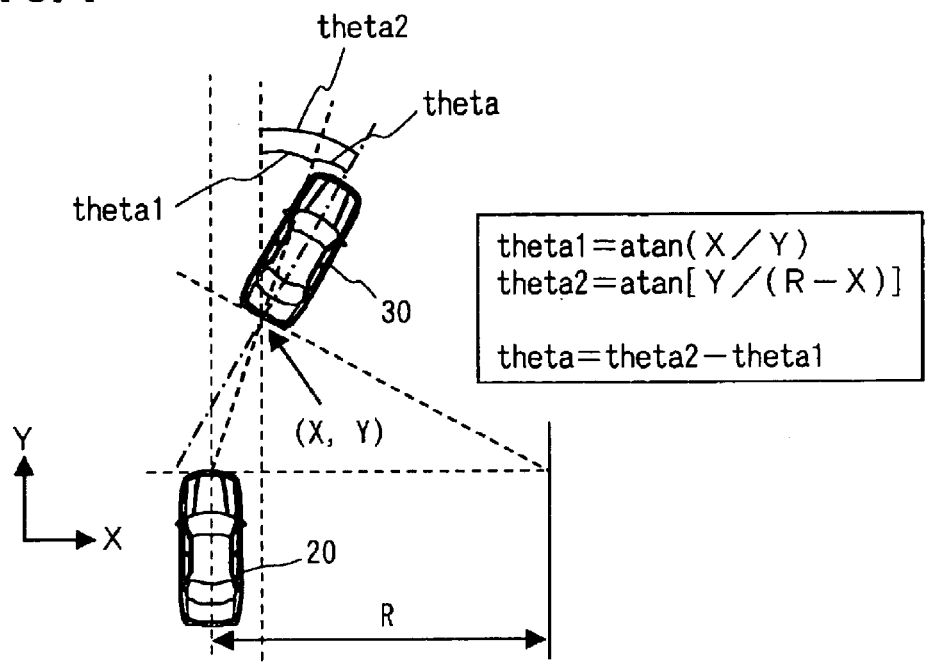
FIG. 10A is a view showing a positional relationship between a reference vehicle and a preceding vehicle, both of which are moving around a curve having a curving radius R.
Figure 10B:
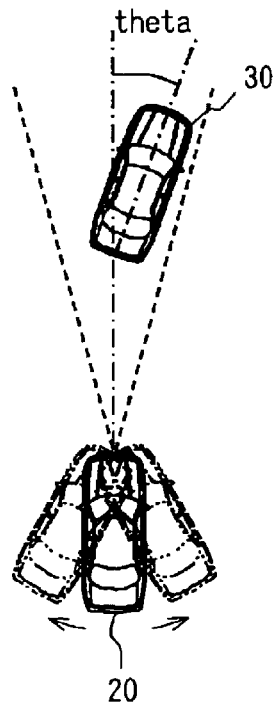
FIG. 10B is a view showing a relative rotation angle (theta) of a preceding vehicle.
Figure 11:
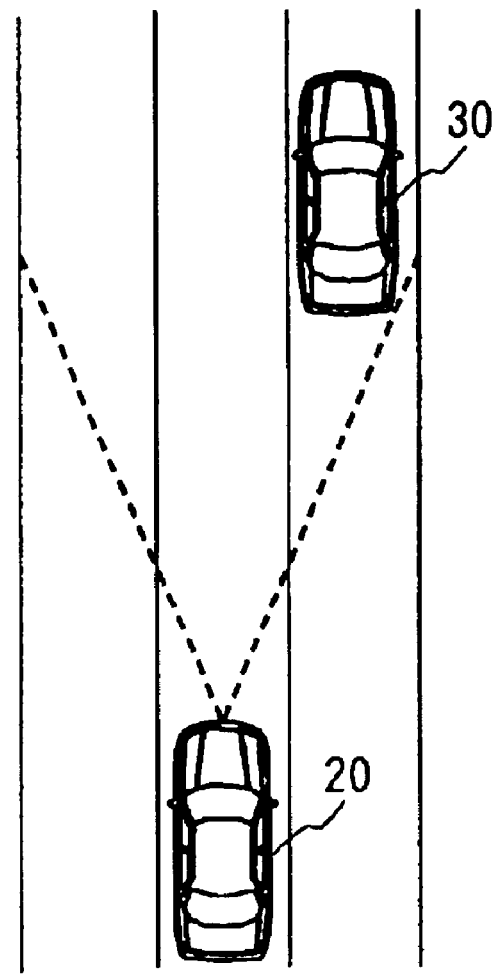
FIG. 11 is a view showing a positional relationship of a reference vehicle moving in a lane and a p receding vehicle moving in an adjacent lane.

FIG. 10A shows a case where both of a reference vehicle 20 and a preceding vehicle 30 are moving in a curve of a curving radius R. Here, a relative rotation angle (theta) of the preceding vehicle that is also shown in FIG. 10B is computed using the following formulae.

theta=theta 2−theta 1    [Formula 5]

Here, theta 1 and theta 2 are shown-below.

theta 1=arc tan (X/Y)    [Formula 6]

theta 2=arc tan [Y/(R−X)]    [Formula 7]

In the other hand, when the both vehicles are moving in a straight road, the curving radius R becomes infinitive. Theta 2 thereby becomes zero, so that theta becomes equal to theta 1 itself when the both vehicles are moving in the straight road.

In actual computing, if the radius R increases more than a given value, the increasing radius sometimes poses a computing problem. Therefore, a countermeasure such that zero, is substituted for theta 2 when the radius R becomes more than the given value is executed.

The computer 4 executes correction of the width center of the preceding vehicle by computing a lateral bias correction amount using the distance L and the relative rotation angle (theta) of the preceding vehicle with respect to the reference vehicle.

The corrected width center (X', Y') of the preceding vehicle is used for determining whether the preceding vehicle is a target for controlling a following distance. When the preceding vehicle is determined to be a target for controlling a following distance, control signals for controlling a following distance with the preceding vehicle are outputted. The control signals are outputted to the brake driver 19, the throttle driver 21, and the automatic transmission controller 16, based on the distance L and relative speed with the preceding vehicle, an own speed of the reference vehicle, a setting state of the cruising control switch 12, and a stepping state of the brake switch 18. Furthermore, indicating signals necessary for the indicator 14 are outputted to notify to a driver.

Furthermore, the throttle driver 21 is operated to control a throttle opening degree. The automatic transmission controller 16 is operated to control a gear position of the automatic transmission. The brake driver 19 is operated to control a brake pressure. The following distance from the reference vehicle to the preceding vehicle is thereby maintained at a target distance. In addition, a real time state is indicated through the indicator 14.

Figure 9:
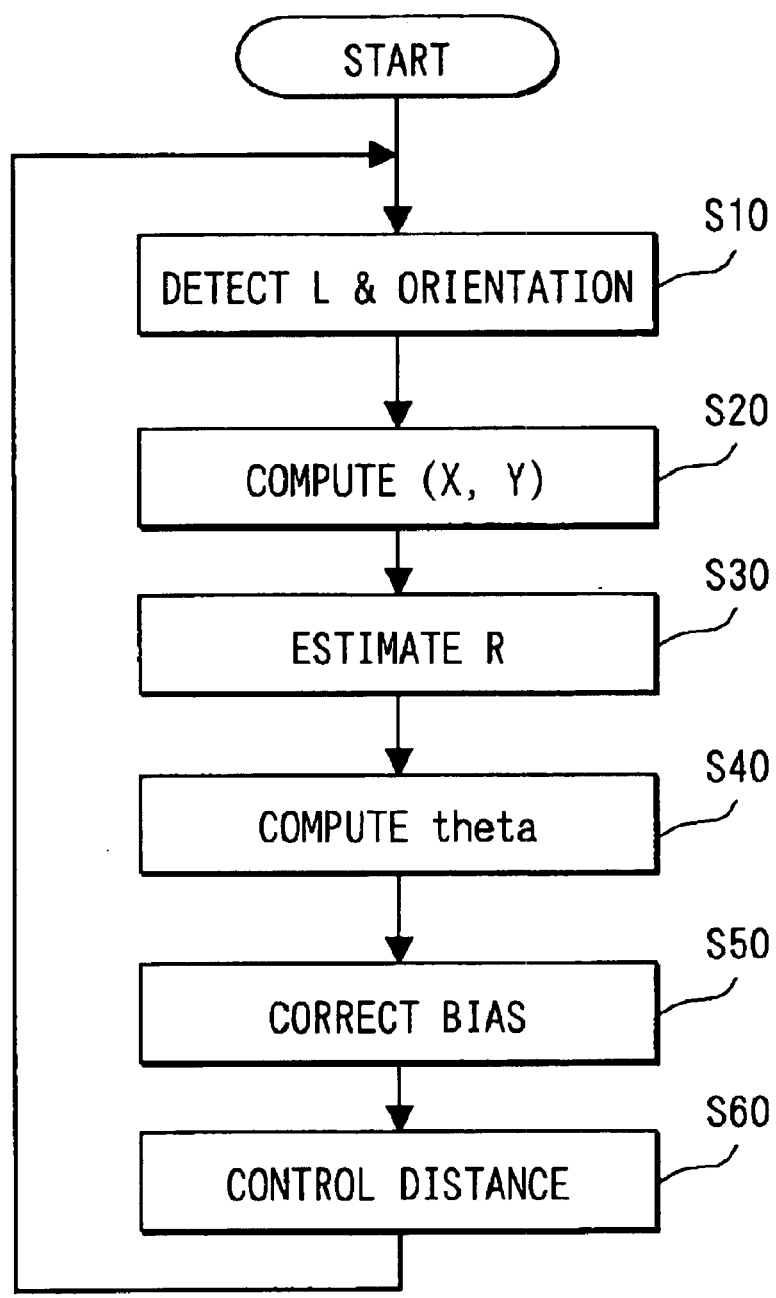
FIG. 9 is a flowchart diagram explaining processing of correcting a lateral bias.

In the next place, correcting processing of a lateral bias of a width center will be explained with reference to FIG. 9. At Step 10, a distance L and orientation to a preceding vehicle from a reference vehicle are detected. At Step 20, width center coordinates (X, Y) of the preceding vehicle are computed using the distance L and the orientation.

At Step 30, a curving radius R of the reference vehicle is estimated. At Step 40, using the curving radius R and the width center coordinates (X, Y) a relative rotation angle (theta) of the preceding vehicle with respect to the reference vehicle is computed. At Step 50, using the computed relative rotation angle (theta) and the distance L a lateral bias correction amount is computed to correct the width center (width center coordinates (X, Y)) of the preceding vehicle.

At Step 60, using the corrected width center coordinates (X', Y') it is determined whether the preceding vehicle is a target for controlling a following distance to it. Furthermore, when the preceding vehicle is determined to be a target, a following distance control to the preceding vehicle is executed.

Thus, in the following distance control system mounted in a reference vehicle of the embodiment, based on a relative position of a reflection object and a curving radius of the reference vehicle, a relative rotation angle of the reflection object is computed. The relative rotation angle of the reflection object is an angle between a direction of reflection radio waves from the reflection object and a direction perpendicular to a width direction of the reflection object. The direction perpendicular to the width direction of the reflection object is assumed to be a longitudinal direction of the reflection object or the preceding vehicle. The relative position of the width center of the reflection object is corrected based on the relative rotation angle of the reflection object.

Hence, even when, of a preceding vehicle moving in an adjacent lane, an actual width center and a detected orientation do not match to each other, the bias of the both can be accurately estimated by previously obtaining a bias according to a relative rotation angle of the preceding vehicle.

Accurately estimating the width center of the preceding vehicle is very important, e.g., for designating a target preceding vehicle in a following distance control system. Namely, when a width center of a preceding vehicle is not accurately estimated, it cannot be determined whether the preceding vehicle is moving in a same lane or in an adjacent lane. As a result, a target vehicle for the following distance control cannot be designated.

Modification

In the embodiment, a lateral bias correction amount is obtained from a relationship between a relative rotation angle of a preceding vehicle and the lateral bias correction amount. However, the lateral bias correction amount depends on a vehicle type. Therefore, lateral bias correction amounts for a plurality of vehicle types that are previously measured can be stored. Furthermore, a size or a vehicle type is determined by a camera 25 shown in FIG. 1 or other methods mounted in a reference vehicle or by reflection strength of radar's reception signals. A lateral bias correction amount is thereby obtained based on a relationship between a relative rotation angle and a lateral bias correction amount according to a determined vehicle type.

It will be obvious to those skilled in the art that various changes may be made in the above-described embodiments of the present invention. However, the scope of the present invention should be determined by the following claims.

What is claimed is:

1. An in-vehicle radar system mounted in a reference vehicle that is moving along a road, comprising:
    radar means for radiating transmission radio waves and detecting reflection radio waves from a reflection object that receives a portion of the transmission radio waves;
    recognizing means for recognizing, based on the detected reflection radio waves from the reflection object, a distance to the reflection object and an orientation of the reflection object with respect to the reference vehicle;
    relative position computing means for computing, based on the recognized distance and the recognized orientation, a relative position of a width center of the reflection object with respect to the reference vehicle;
    curving radius detecting means for detecting a curving radius of the road;
    relative rotation angle computing means for computing, based on the computed relative position and the detected curving radius, a relative rotation angle of the reflection object that is an angle between a direction of the transmission radio waves advancing to the width center of the reflection object and a direction perpendicular to the width direction of the reflection object; and
    correcting means for correcting the computed relative position of the width center of the reflection object by using the computed relative rotation angle.

2. The radar system of claim 1,
    wherein the relative position of the reflection object is indicated by using a longitudinal direction of the reference vehicle and a lateral direction of the reference vehicle.

3. The radar system of claim 1,
    wherein the relative rotation angle computing means computes the relative rotation angle based on a difference between a first angle and a second angle,
    while the first angle relates to an angle between a longitudinal direction of the reference vehicle and the direction of the transmission radio waves advancing to the width center of the reflection object, and
    wherein the second angle relates to an angle between the longitudinal direction of the reference vehicle and the direction perpendicular to the width direction of the reflection object.

4. The radar system of claim 1,
    wherein the correcting means includes a lateral bias correcting map and lateral bias detecting means,
    wherein the lateral bias correcting map includes a lateral bias of the computed relative position of the width center of the reflection object from an actual relative position of the width center, wherein the lateral bias is generated when the transmission radio waves transmitted to the actual relative position of the width center of the reflection object having the computed relative rotation angle, and
    wherein the lateral bias detecting means obtains the lateral bias of the computed relative position of the width center by applying the relative rotation angle to the lateral bias correcting map.

5. The radar system of claim 4,
    wherein, in the lateral bias correcting map, the lateral bias increases with increasing relative rotation angle.

6. The radar system of claim 4,
    wherein, in the lateral bias correcting map, the lateral bias increases with decreasing distance to the reflection object under a condition where the relative rotation angle is fixed to a given angle.

7. The radar system of claim 1,
    wherein the correcting means corrects the computed relative position of the width center of the reflection object when the recognized distance to the reflection object is a given distance or less.

8. The radar system of claim 1, further comprising:

size estimating means for estimating a size of the reflecting object, wherein the correcting means corrects the computed relative position of the width center of the reflection object by using the computed relative rotation angle and the estimated size.

9. A bias correcting method for a reflection object recognized by an in-vehicle radar system mounted in a reference vehicle that is moving along a road, the in-vehicle radar system including:

radar means for radiating transmission radio waves and detecting reflection radio waves from the reflection object that receives a portion of the transmission radio waves; and recognizing means for recognizing, based on the detected reflection radio waves from the reflection object, a distance to the reflection object and an orientation of the reflection object with respect to the reference vehicle, the bias correcting method comprising-steps of:

computing, based on the recognized distance and the recognized orientation, a relative position of a width center of the reflection object with respect to the reference vehicle;

detecting a curving radius of the road;

computing, based on the computed relative position and the detected curving radius, a relative rotation angle of the reflection object that is an angle between a direction of the transmission radio waves advancing to the width center of the reflection object and a direction perpendicular to the width direction of the reflection object; and correcting the computed relative position of the width center of the reflection object by using the computed relative rotation angle.

* * * * *